3,212,968
METHOD OF TISSUE FIXATION WITH PVP-FORMALDEHYDE COMPLEX OR 5-LOWER ALKYL PVP-FORMALDEHYDE COMPLEX
Jerome F. Fredrick, New York, N.Y., assignor to The Dodge Chemical Company, Boston, Mass., a corporation of Massachusetts
No Drawing. Filed Sept. 4, 1962, Ser. No. 221,346
4 Claims. (Cl. 167—49.5)

This invention relates to the fixation of biological tissue, particularly jaundiced tissue, and to compositions useful therefor.

Formaldehyde has long been used to firm and preserve tissue and is typically included in embalming compositions. However, such use with jaundiced tissue containing bile pigments results in a marked green coloration, heretofore partially masked by heavy application of cosmetics. This green coloration is believed to be caused by the oxidative conversion of the yellow-orange bile pigment bilirubin to the intensely green biliverdin. This conversion readily occurs in acid media.

In jaundice, regardless of the etiology, bilirubin is bound to the reticuloendothelial tissues via the lysine residues of the proteins in the tissues. Formaldehyde, in combining with protein or amino acid, increases the acidity by proton release. This acidity probably causes the release of oxidizing substances from the tissue.

The present invention has for its main object the provision of an improved method of fixing and preserving tissue, particularly jaundiced tissue wherein the tissue is decolorized and a green coloration avoided, and to novel compositions therefor.

It has now been discovered that formaldehyde can be combined with polyvinylpyrrolidone (PVP) to form an adduct or electrically charged complex from which formaldehyde is released in situ and which avoids limitations in the prior use of formaldehyde. Jaundiced tissue treated with this adduct is firmed and preserved without the development of green color. Indeed, the tissue is decolorized to produce a more normal appearance particularly useful for embalming purposes. Use of the complex also results in a more thorough, controlled, and even tissue preservation with less artifacts.

When jaundiced tissue is treated with the above complex, two reactions occur practically simultaneously. First there is a complexing of the bile pigment in preference to the tissue. Secondly, formaldehyde is released and reacts with the decolorized tissue, causing the tissue to firm. The bile pigment held in the complex does not oxidize to biliverdin and can be washed away, if desired. Since the bile pigments are tetrapyrroles similar in structure to PVP, PVP fragments may replace the pigments attached to the tissue. Tests indicate that up to 93% of the bilirubin present can be extracted from tissue by treatment with the polyvinylpyrrolidone-HCHO complex.

Studies indicate that the complex comprises two vinylpyrrolidone monomer units per formaldehyed molecule which is equivalent to about 7.5 parts by weight PVP per part formaldehyde. Compositions of this ratio are preferred to fully complex the formaldehyde. Excess PVP can be used, if desired.

The complex forms in aqueous solution, for example by adding PVP to aqueous formaldehyde, and allowing the mixture to stand for 12–24 hours at 20–30° C. at a pH of 6.0 to 7.0. Paraformaldehyde can be used in place of formaldehyde. The complexes can also be formed by intimately mixing as by rolling or grinding dry paraformaldehyde with dry PVP. Some 6–8 hours are required at room temperature, but only 1–2 hours at 30–40° C.

Based on electrophoretic studies, chemical reactions and infrared spectra, the following structure is proposed for the PVP formaldehyde complexes:

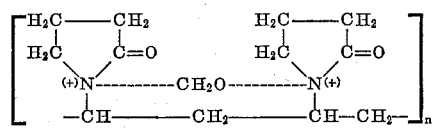

Uncomplexed PVP shows practically no migration during electrophoresis at pH 8.6 for two hours at 200 volts and 2.0 milliamperes on Whatman No. 1 paper. During the same time, and under the same conditions, the PVP-formaldehyde complex migrates toward the cathode for a distance of 8.0 millimeters. This electropositive behavior is believed to be due to the quaternization of the nitrogen atoms through the electrostatic sharing of electrons. The electrostatic bond distances between N–C and O–N are approximately equal at 1.37 and 1.36 Angstrom units, respectively.

The infrared spectra of the complex shows the following absorption peaks:

*Table I*

| Wave length (microns): | Intensity |
|---|---|
| 2.3 to 2.4 | Weak, broad. |
| 2.9 to 3.1 | Medium, broad. |
| 3.4 to 3.55 | Strong, sharp. |
| 6.0 | Strong, broad. |
| 6.1 | Strong, sharp. |
| 6.0 to 7.0 | Strong, sharp. |
| 7.3 | Strong, very sharp. |
| 7.65 | Medium, broad. |
| 7.8 to 7.9 | Medium, broad. |
| 8.1 | Medium, sharp. |
| 8.6 to 8.7 | Medium, broad. |
| 9.2 | Medium, sharp. |
| 10.75 | Medium, broad. |
| 11.8 to 12.0 | Weak, broad. |
| 13.8 to 14.0 | Medium, broad. |

The fact that the complex strongly binds the bile pigment bilirubin is shown by the following data of Table II. Sodium bilirubinate and the PVP formaldehyde complex (7.5 to 1 weight ratio) were mixed in aqueous solution in the various amounts indicated. All mixtures were adjusted to pH 7.0 and placed in ¾″ Visking dialysis membrane tubes and the tubes immersed in 100 ml. distilled water for 24 hours at room temperature (20–22° C.). After the 24 hour immersion, the dialysate was colorimetrically analyzed for bilirubin as follows:

*Table II*

| Percent Bilirubin | Percent Complex | Percent Bilirubin in Dialysate |
|---|---|---|
| 2.00 | 0.00 | 1.98 |
| 2.00 | 0.25 | 0.87 |
| 2.00 | 0.50 | 0.80 |
| 2.00 | 1.00 | 0.66 |
| 2.00 | 2.00 | 0.12 |
| 2.00 | 4.00 | 0.00 |
| 2.00 | 5.00 | 0.06 |

After 24 hours immersion, each tube was extracted with an equal volume of chlorobenzene, a good solvent for bilirubin, by shaking for two minutes and compared with an equal extract of a solution of sodium bilirubinate as a control. The control gave an intense orange-yellow color to the chlorobenzene while the material from the complex containing dialysis tubes gave pale yellow colorations showing a strong resistance to extraction.

According to the above data, the optimum concentration of complex for binding this pigment is about 2%.

Various amounts of PVP were added to 8% by weight aqueous solutions of formaldehyde and allowed to stand until the complex formed. The availability of the formaldehyde was assayed by the alkaline peroxide method (A.O.A.C. Methods 4.112, 1960, 9th edition) with the following results indicative of the continued availability for reaction of the HCHO in the complex.

*Table III*

| Percent PVP: | Percent HCHO detected after complexing |
|---|---|
| 0.0 | 7.9 |
| 1.0 | 7.5 |
| 4.0 | 7.8 |
| 8.0 | 7.7 |
| 16.0 | 7.8 |
| 32.0 | 7.4 |
| 54.0 | 7.1 |
| 64.0 | 7.0 |

PVP is currently available in three grades, K–30, K–60, and K–90 differing primarily in molecular weight. The K–90 grade is understood to have a molecular weight of about 350,000 and the K–30 grade of the order of 50,000, with K–60 being an intermediate grade. Any of these grades can be used, but mixtures of K–90 and K–30 are preferred wherein the K–30 grade predominates, for example, mixtures containing about 80% by weight K–30.

Similar polymers may be substituted for PVP, for example, Devlex 130 of the Dow Chemical Company, having the recurring structure

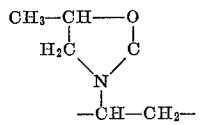

The presence of the vinyl chain, a five-member substituent ring attached via the nitrogen atom, and the carbonyl group adjacent the nitrogen atom are believed to be the important structural features. PVP is preferred.

The above complex can be used as a dry powder or in any desired aqueous dilution to fix and preserve tissue. For embalming purposes, it can be included, alone or in admixture with other compatible agents, in arterial fluids, preferably 2 to 5% by weight concentration although the concentraiton is not critical. 2% solutions are most preferred. Concentrated solutions can be prepared for dilution by the user. It can also be incorporated in pastes for surface application or as cavity compounds. Gels of the complex, formed for example at about 45% aqueous complex concentration, are tacky and can be used for sealing incisions and the like. Its use in preserving tissue generally is preferable to uncomplexed formaldehyde since it provides less rupturing and altering of tissue structure, color, and appearance, and provides less rigidity and artifacts. pH of aqueous solutions is not critical although high pH's should be avoided due to limited solubility. pH's of about 6 to 8 are preferred.

It should be understood that the foregoing description is for the purpose of illustration and that the invention includes modifications within the scope of the appended claims.

I claim:

1. A method for fixative treatment of tissue comprising contacting said tissue with an effective amount of an inclusion complex formed by mixing formaldehyde and a polymer selected from the group having recurring units of the formula

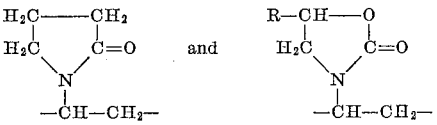

wherein R is a lower alkyl radical, said complex having at least two of the above recurring units of said polymer per molecule of formaldehyde and being electrophoretically mobile toward the cathode.

2. A method according to claim 1, wherein said polymer is polyvinylpyrrolidone.

3. The method of embalming which comprises contacting the tissue of a corpse with an effective amount of an inclusion complex formed by mixing formaldehyde and polyvinylpyrrolidone, said complex having recurring units of the structure

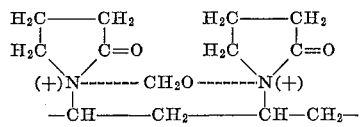

said complex having at least two vinylpyrrolidone monomer units per molecule of formaldehyde, being electrophoretically mobile toward the cathode, and having the infra-red absorption peaks given in Table I.

4. The method of embalming which comprises contacting the tissue of a corpse with an effective amount of an inclusion complex formed by mixing formaldehyde and a polymer having repeating units of the structure

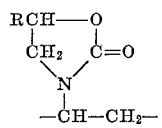

wherein R is lower alkyl, said complex having recurring units of the structure

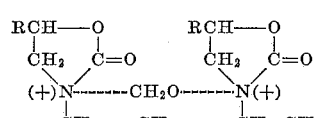

said complex having at least two of said polymer repeating units per molecule of formaldehyde and being electrophoretically mobile toward the cathode.

References Cited by the Examiner

UNITED STATES PATENTS

| 2,339,314 | 4/43 | Zerweck et al. | 260—67.5 |
| 2,517,128 | 8/50 | Meunier et al. | 260—67.5 |
| 2,572,467 | 10/51 | Gebhart | 260—236.5 |
| 2,786,081 | 3/57 | Kress | 167—49.5 X |
| 2,880,134 | 3/59 | Robinette | 167—49.5 |
| 3,043,830 | 7/62 | Haskell et al. | 260—236.5 |
| 3,057,775 | 10/62 | Rendon | 167—49.5 |

FOREIGN PATENTS

| 851,099 | 10/52 | Germany. |

JULIAN S. LEVITT, *Primary Examiner.*